June 9, 1942.   W. B. BATTEN   2,285,556
VAPOR ELECTRIC DEVICE
Filed July 27, 1940

WITNESSES:
James H. Young
Grad C. Wilham

INVENTOR
Wendell B. Batten.
BY
S. A. Strickled
ATTORNEY

Patented June 9, 1942

2,285,556

UNITED STATES PATENT OFFICE 2,285,556

VAPOR ELECTRIC DEVICE

Wendell B. Batten, East McKeesport, Pa., assignor to Westinghouse Electric & Manufacturing Company, East Pittsburgh, Pa., a corporation of Pennsylvania Application July 27, 1940, Serial No. 347,989

7 Claims. (Cl. 175—363)

My invention relates to a vapor electric device, and particularly to a control system for rapidly blocking operation of a vapor electric converter in response to arc back in any valve of the converter.

In the operation of vapor electric devices, it has been found that the individual valves comprising a converter are subject to random faults known as arc-back. It has also been found that after one valve has arched back, other valves in the converter will be effected and will similarly arc back unless blocking potential is immediately applied to all of the valves of the converter.

In the construction according to my invention, I have provided an arc-back responsive device associated with the several anode leads of the converter valves and have supplied a relay actuated by an arc-back responsive device to rapidly apply biasing or blocking potential to the grid transformer controlling the operation of the valves.

I have also found that if the arc-back responsive relays are composed of parallel connected discharge devices that the discharge devices themselves become an indication of the valve which has arced back.

It is, therefore, an object of my invention to provide a control system for rapidly applying blocking potential to the valves of a vapor-electric device.

It is a further object of my invention to provide a control system having means for indicating which of the valves arc back.

It is a further object of my invention to provide an improved arc-back responsive relay.

Other objects and advantages of my invention will be apparent from the following detailed description taken in conjunction with the accompanying drawing, in which:

Fig. 2 is a diagrammatic illustration of the active fluxes in an arc-back responsive device according to my invention; and Fig. 3 is a diagrammatic illustration of the potentials delivered by my arc-back responsive devices.

Figure 1:
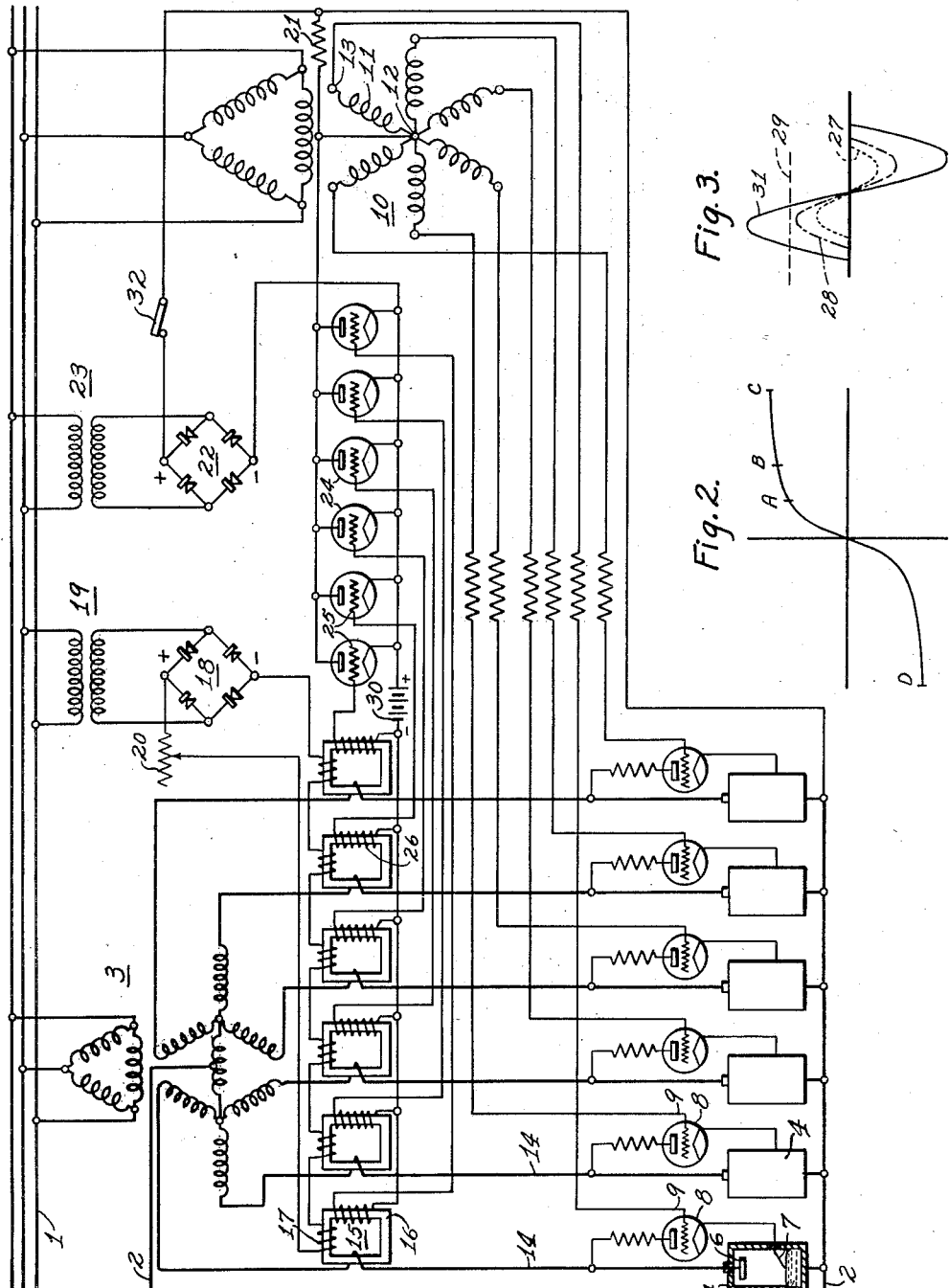
Figure 1 is a schematic illustration of a vapor-electric device according to my invention.
Figure 1:
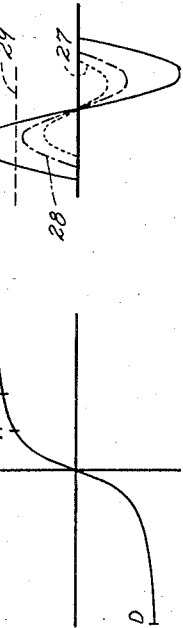

In the exemplary embodiment according to my invention, an alternating-current circuit 1 is connected to a direct-current circuit 2 by means of a suitable rectifier transformer 3. The secondary phase terminals of the rectifier transformer 3 are connected to vapor-electric valves 4, each of said valves 4 including a vaporizable reconstructing cathode 5 of suitable material such as mercury, an anode 6 cooperating with the cathode 5 and a control electrode 7 herein illustrated as a make-alive electrode.

Each of the make-alive electrodes 7 is connected to a suitable source of make-alive energy, herein illustrated as the associated anode 6, although it is obvious that any suitable source, such as an auxiliary transformer can be utilized for supplying make-alive energy. Suitable firing tubes, herein illustrated as grid controlled tubes 8, are connected between the source of make-alive energy and the make-alive electrode 7. The grids 9 of the firing tubes 8 are controlled by means of a suitable grid transformer 10 which may be connected to any suitable source of in-phase potential such as the alternating-current circuit 1.

The grid transformer 10 has a plurality of phase windings 11 with a common connection 12 which is connected to the cathodes 5 of the valves 4 of the converter and the phase terminals 13 of which are connected to the control grids 9. Associated with each of the anode leads 14 of the vapor-electric valves 4 is a suitable arc-back responsive relay 15 comprising a core 16 of magnetic material which is subject to the flux generated by the passage of current in the associated anode lead 14.

Each of the arc-back responsive devices 15 is provided with a saturating coil 17 supplied from a suitable source of potential such as the full wave rectifier 18 which may be connected to any suitable source of potential such as a transformer 19 energized from the alternating-current circuit 1. Preferably the saturating coils 17 of the arc-back responsive devices 15 are connected in series and the amount of current flowing therein determined by means of a suitable impedance 20 connected in series with the coils 17.

A resistor 21 connected in series between the cathodes 5 and the midtap 12 of the grid transformer 10 is connected to a suitable source of direct-current energy, such as a full wave rectifier 22 which is supplied with alternating current from any suitable source, such as the transformer 23 connected to the alternating-current circuit 1. In series between the resistor 21 and the source of direct current 22 is a plurality of auxiliary grid controlled discharge-devices or relay valves 24, preferably corresponding in number to the valves 4 of the vapor electric device. Each of the relay valves 24 is provided with a control grid 25 and the individual valves are associated with individual secondary coils 26 on the several arc-back responsive devices 15.

In the operation of the control system according to my invention, sufficient current is supplied to the saturating coils 17 of the arc-back responsive devices 15 to produce a flux therein which saturates the coil above the knee of the flux curve, as indicated at A in Fig. 2.

The normal flow of current in the anode lead 14 generates a flux in the same direction as that produced by the saturating coil and very little flux change will then be manifested in the saturating coil, as indicated at B in Fig. 2. This small change in flux produces a relatively small voltage 27 in the secondary coil 26 of the arc responsive relay 15, this voltage being insufficient to trip the relay tube 24 associated therewith.

Also, in the event of short circuit or overload on the converter, the flux will advance to point C, as indicated at C in Fig. 2. This relatively small flux change will produce a relatively small potential 28 which is not sufficient to overcome the natural breakdown potential 29 of the relay tubes 24, or if the tube is of the suitable low impedance type, the suitable biasing potential 30 may be inserted between the cathodes of the parallel connected tubes 24 and the secondary windings 26 of the arc-back responsive devices 15.

However, in the event of arc back the flux generated by the current in the anode connection 14 will be in opposite direction to the flux produced by saturating coils 17 and will reverse the flux to a point D, as shown in Fig. 2. This large flux change will produce a relatively high control potential 31 in the secondary winding 17 which will trigger the associated relay tube 24 applying the potential of the direct-current source 22 across the resistor 21 and substantially instantaneously blocking all of the valves 4 of the converter.

Since the operation of any one of the parallel connected tubes 24 reduces the potential across the remaining tubes 24 to the arc-drop potential of the current carrying tube, there will not be sufficient potential available to cause any of the other tubes 24 to break down. Consequently, the operating tube 24 indicates which of the parallel valves 4 have undergone an arc back. Any suitable means such as a switch 32 which may be either automatically or manually operated may be used for interrupting the current flow from the direct-current source 22 through the biasing resistor 21 to restore the converter to operation.

While for purposes of illustration, I have shown and described a specific embodiment of my invention, it is apparent that changes and modifications can be made therein without departing from the true spirit of my invention or the scope of the appended claims.

I claim as my invention:

1. A vapor-electric conversion system comprising a plurality of vapor-electric valves, a source of control energy for said valves, control valves for applying energy from said source to said valves, grid means for controlling the conductivity of said control valves, a grid transformer for supplying potential to said grid means, a resistor connected between said grid transformer and the cathodes of said valves, a core of magnetic material associated with each of said valves and energized by the current flowing thereto, means for saturating the core associated with said valves, a secondary winding on each of said cores, a grid controlled auxiliary valve associated with each of said secondary windings, a source of direct-current potential connected in series with said resistor and with said auxiliary valves for applying biasing potential to said grid transformer.

2. In a vapor-electric converter of the make-alive type, a plurality of make-alive type valves a source of control energy for said valves, control valves for applying energy from said source to said valves, grid control means for controlling the conductivity of said control valves, a grid transformer for supplying potential to the grids of said grid controlled means, a resistor connected in series between said grid transformer and the cathode of said valves, a plurality of parallel connected grid controlled auxiliary valves, a source of direct-current connected in series with said resistor and said grid controlled valves, an arc-back responsive relay associated with each of said make-alive valves for supplying controlling impulses to the grids of said auxiliary valves.

3. A vapor electric device comprising a plurality of electric valves, a source of control energy for said valves, control valves for applying energy from said source to said valves, grid means for controlling the conductivity of said control valves, a current carrying lead for each of said valves, a magnetic core for each of said leads, said core being traversed by the flux generated by the passage of current through said lead, a saturating coil on said core, means for passing current through said coil to saturate said core, and a secondary winding on said core.

4. A vapor electric device comprising a plurality of electric valves, a source of control energy for said valves, control valves for applying energy from said source to said valves, grid means for controlling the conductivity of said control valves, a current carrying lead for each of said valves, a magnetic core for each of said leads, said core being traversed by the flux generated by the passage of current through said lead, a saturating coil on said core, means for passing current through said coil to saturate said core, a secondary winding on said core and relay means controlled by the current generated in said secondary windings.

5. A vapor electric device comprising a plurality of electric valves, a source of control energy for said valves, control valves for applying energy from said source to said valves, grid means for controlling the conductivity of said control valves, a current carrying lead for each of said valves, a magnetic core for each of said leads, said core being traversed by the flux generated by the passage of current through said lead, a saturating coil on said core, means for passing current through said coil to saturate said core, a secondary winding on said core, relay means controlled by the current generated in said secondary windings, and means energized by operation of said relay means for applying blocking potential to said grid means.

6. An arc-back responsive device for an electric valve comprising a lead carrying the current passed by the valve, a saturable magnetic core linked by said lead, said lead establishing a flux in said core in a predetermined direction during normal operation of the valve, means for establishing a premagnetizing flux in said core in the same direction as the flux normally produced by said lead, said premagnetizing flux being sufficient to substantially saturate said core, a secondary winding linked with said core, and a relay responsive to the potential generated in said secondary winding.

7. In an electric valve device, a conductor carrying the current passing through the valve, a saturable magnetic core interlinked with said conductor, said conductor establishing a flux of a predetermined direction in said core during normal operation of said valve, means for establishing a magnetic flux to substantially saturate the core, said saturating flux being in the same direction as the flux normally produced by said conductor, a secondary winding on said core, a relay tube, grid means for controlling the conductivity of the tube and means for impressing the potential of said secondary winding on said grid.

WENDELL B. BATTEN.